(12) United States Patent
Hugi (10) Patent No.: US 10,232,638 B2
(45) Date of Patent: Mar. 19, 2019

(54) SYSTEM AND METHOD FOR APPLYING THIN COATING ON LARGE AREA SURFACE

(71) Applicant: Palram Industries (1990) Ltd., Kibbutz Ramat Yohanan (IL)

(72) Inventor: Reuven Hugi, Nahariya (IL)

(73) Assignee: PALRAM INDUSTRIES (1990) LTD, Kibbutz Ramat Yohanan (IL)

( * ) Notice: Subject to any disclaimer, the term of this patent is extended or adjusted under 35 U.S.C. 154(b) by 0 days.

(21) Appl. No.: 15/039,034

(22) PCT Filed: Nov. 27, 2014

(86) PCT No.: PCT/IL2014/051036
§ 371 (c)(1),
(2) Date: May 25, 2016

(87) PCT Pub. No.: WO2015/079447
PCT Pub. Date: Jun. 4, 2015

(65) Prior Publication Data
US 2017/0209877 A1 Jul. 27, 2017

Related U.S. Application Data

(60) Provisional application No. 61/910,041, filed on Nov. 28, 2013.

(51) Int. Cl.
*B41J 11/02* (2006.01)
*B05D 5/00* (2006.01)
(Continued)

(52) U.S. Cl.
CPC ............ *B41J 11/0015* (2013.01); *B05D 1/28* (2013.01); *B05D 1/34* (2013.01); *B05D 3/0218* (2013.01);
(Continued)

(58) Field of Classification Search
CPC .... B41J 11/0015; B41J 11/002; B41J 2/1433; B05D 1/34; B05D 3/0254; B05D 3/0218
See application file for complete search history.

(56) References Cited

U.S. PATENT DOCUMENTS 5,266,349 A 11/1993 Bok
2002/0024544 A1 2/2002 Codos
(Continued)

FOREIGN PATENT DOCUMENTS

JP 2000/153182 6/2000
WO WO 2007140480 12/2007

OTHER PUBLICATIONS

European Search Report of EP Application No. 14865277.9 dated Aug. 18, 2017.
(Continued)

*Primary Examiner* — Geoffrey S Mruk
(74) *Attorney, Agent, or Firm* — Pearl Cohen Zedek Latzer Baratz LLP (57) ABSTRACT

Embodiments of the invention are related to a coating system and a method for coating a surface of a product. The system may include a coating unit, comprising; a droplet deposition assembly configured to deposit droplets of a coating material from a plurality of nozzles according to a predetermined deposition pattern, to form a coating on the surface. The system may further include a curing unit for curing at least one polymeric component included in the coating material and a control unit configured to receive the predetermined deposition pattern and control the coating unit to deposit the predetermined deposition pattern on the surface, such that the coating has a thickness deviation of less than 1 micron per 1 meter.

8 Claims, 9 Drawing Sheets

(51) Int. Cl.
  *B41J 11/00*     (2006.01)
  *C09D 175/04*    (2006.01)
  *B05D 1/34*      (2006.01)
  *B05D 3/02*      (2006.01)
  *B05D 1/28*      (2006.01)
  *B41J 2/14*      (2006.01)
  *B05B 1/14*      (2006.01)
  *B05B 13/04*     (2006.01)

(52) U.S. Cl.
  CPC ........... *B05D 3/0254* (2013.01); *B41J 11/002* (2013.01); *C09D 175/04* (2013.01); *B05B 1/14* (2013.01); *B05B 13/0447* (2013.01); *B05D 5/00* (2013.01); *B05D 2252/00* (2013.01); *B41J 2/1433* (2013.01)

(56) References Cited

U.S. PATENT DOCUMENTS

| | | |
|---|---|---|
| 2003/0161964 A1 | 8/2003 | Leonard |
| 2005/0255249 A1 | 11/2005 | Schlatterbeck et al. |
| 2009/0252878 A1 | 10/2009 | Shinohara et al. |
| 2009/0262159 A1 | 10/2009 | Lang |
| 2010/0221449 A1 | 9/2010 | Schlatterbeck et al. |
| 2012/0092409 A1* | 4/2012 | Wu ................. B41J 2/2139 347/19 |
| 2012/0120142 A1* | 5/2012 | Tom ................ B41J 2/2114 347/15 |
| 2013/0122206 A1 | 5/2013 | Ahmed et al. |

OTHER PUBLICATIONS

International Search Report of Application No. PCT/IL2014/051036 dated Apr. 2, 2015.

* cited by examiner

SYSTEM AND METHOD FOR APPLYING THIN COATING ON LARGE AREA SURFACE

CROSS-REFERENCE TO RELATED APPLICATIONS

This application is a National Phase Application of PCT International Application No. PCT/IL2014/051036, International Filing Date Nov. 27, 2014, entitled "System and Method for Applying Thin Coating on Large Area Surface", published on Jun. 4, 2015 as International Patent Application Publication No. WO 2015/079447, claiming priority of U.S. Provisional Patent Application No. 61/910,041, filed Nov. 28, 2013, which is incorporated herein by reference in its entirety.

BACKGROUND OF THE INVENTION

Coating of boards or panels is known in the art. In certain cases the coating is required to be thin and homogenous. In some of these cases, the thinner the coating is, the better is the result, for one or more of many reasons such as saving of costs of the coating materials, added weight to the basic board/panel, improved homogencity of the coating layer, etc. Some known methods for applying thin coating include submerging of the panel in a container containing a fluidic coating material and allowing the fluid to drip off the panel by virtue of gravity (or other similar methods) after the panel is taken out of the container. Another known method involves spray application. This method can be applied with a spray aerosol or dedicated spray booth with spray gun. The quality of the surface finish can be better than all other methods when a trained skilled operator completes the process, as long as the substrate is clean and the coating has no adhesion issues.

However, the coating application may be limited due to 3D effects, and its homogeneity is very hard to achieve. The known methods suffer of various drawbacks such as poor homogeneity, too thick coating which deteriorates the quality of transparency of the coated board and deteriorate the strength of the coating layer; for relatively mid-scale panels moving over to a facility other than that where the panels are produced is required; long application of the time coating layer is required, from beginning to a point where the coated panel may be moved over, etc.

There is a need for system and methods for applying thin and homogeneous coating layer or layers on large areas of boards, panels and other products, whether having plane surface or 3D formed surface, which ensures thin and yet homogeneous layer, applicable at the production facility of the panels and consuming short time from application to end of process.

SUMMARY OF THE INVENTION

Embodiments of the invention are related to a coating system and a method for coating a surface of a product. The system may include a coating unit that may comprise: a droplet deposition assembly configured to deposit droplets of a coating material from a plurality of nozzles according to a predetermined deposition pattern, to form a coating on the surface. The system may further include a curing unit for curing at least one polymeric component included in the coating material and a control unit configured to receive the predetermined deposition pattern and control the coating unit to deposit the predetermined deposition pattern on the surface. I some embodiment, the coating may have a thickness deviation of less than 1 micron per 1 meter. In some embodiments, the product may be a rigid product. In some embodiments, the coating may be transparent to visual light.

In some embodiments, the droplet deposition assembly may include, a droplet head having a plurality of droplet deposition nozzles and a droplet head movement unit for moving the droplet head. In some embodiments, the system may include a conveyor for conveying the product to the coating unit. In some embodiments, the droplet deposition assembly may be configured to deposit two types of coating materials and the predetermined pattern may include predetermined locations for depositing droplets of each of the two types of coating materials.

In some embodiments, the droplet deposition assembly may be an inkjet printhead. In some embodiments, the distance between a lace of droplet deposition assembly facing the surface and the surface may be between 0.5-10 mm.

In some embodiments, a droplets size may be less than 50 Pico liters. In some embodiments, a velocity of the droplets may be less than 20 meter/second.

In some embodiments, the system may include a pre-coating surface preparation unit configured to treat the surface prior to depositing the pattern. The pre-coating surface preparation unit may include at least one of: a heating unit and an anti-static mean.

In some embodiments, the coating material includes a solvent and the coating system may include a solvent evaporation unit. In some embodiments, the system may include a post-coating heating unit for heating the coated surface.

In some embodiments, the coating system may be adopted to be included in the product production line. Additionally, the production line may have a production rate and the coating system may coat the surface of the product at the production rate.

Some embodiments of the present invention may be directed to a method of coating a surface of a product. The method may include depositing droplets of a coating material in a predetermined pattern on the surface from a plurality of nozzles included in a droplet deposition assembly, the coating material includes at least one polymeric component, and curing the at least one polymeric component in the deposited coating material to form a coating on the surface. In some embodiments, the coating may have a thickness deviation of less than 1 micron per 1 meter. In some embodiments, the coating may be transparent in the visual light.

In some embodiments, depositing may include depositing two different types of coating materials and the predetermined pattern may include the location of each droplet from the two different types of coating materials. In some embodiments, each of the different coating materials may include a polymeric component and curing the polymeric component at each of the two different coating materials may be such that a cross-related matrix may be formed having a desired feature of the two coating materials. Additionally or alternatively the two types of coating materials may include a first coating material having a polymeric component and the second coating material having solution with solid functional particles, such that the predetermined pattern includes functional particles of the second material interlaced in a grid of the first material. In some embodiments, the deposition pattern may be a repetitive pattern such that a constant distance may be form between and two neighboring particles in at least one of a row and a column of the pattern, such that the distance may be no greater than 70 microns.

In some embodiments, the method may include additional treatments, for example, heating the surface prior to depositing the coating material. In some embodiments, the method may include evaporating a solvent in a solvent evaporation unit, when the coating material includes a solvent. In some embodiments, the method may include heating the coated material after the deposition.

In some embodiments, the method may include controlling the droplets size to be smaller than 50 Pico liter. Additional controlling may include controlling a velocity of the droplets to be less than 20 meter/second.

Some additional aspects of the invention may be related to a polymeric coating for coating a surface of a rigid product. The coating may be coated using at least a coating material having at least one polymeric component. The coating may further have a thickness deviation of less than 1 micron per 1 meter. In some embodiments, the coating may be transparent to visual light. In some embodiments, the thickness of the coating may be at most 10 microns. In some embodiments, the width of the coating may be at least 3 meters.

In some embodiments, the coating may include two coating materials deposited on the substrate at a predetermined pattern. In some embodiments, the predetermined pattern includes a repetitive pattern of first and second coating materials.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Homogeneous and thin coating of surfaces with liquidized materials may be achieved by the application of coating material in as small as possible particles onto the working surface, while maintaining high surface tension of the coating material and high wetting coefficient (or low wetting angle Q) between the working material and the coating material. Various coated and various coating materials may require specific adaptation of coating parameters, to allow the achieving of thin and homogeneous coating with strong holding of the coated surface.

Coating parameters may be one or more from the exemplary list consisting of temperature of the coated surface during the process, temperature of the coating material during the process, viscosity of the coating material, amount of evaporating solvents in the coating material in the beginning of the process and their tendency to evaporate, spontaneously or with assistance, the tendency of the coating material to be formed in small droplets (depending, for example, on the amount of energy required to form a droplet in a defined size and the design of the droplet forming element), the distance of the applying unit from the working surface, the angle by which a droplet hits the working surface, etc.

Figure 1:
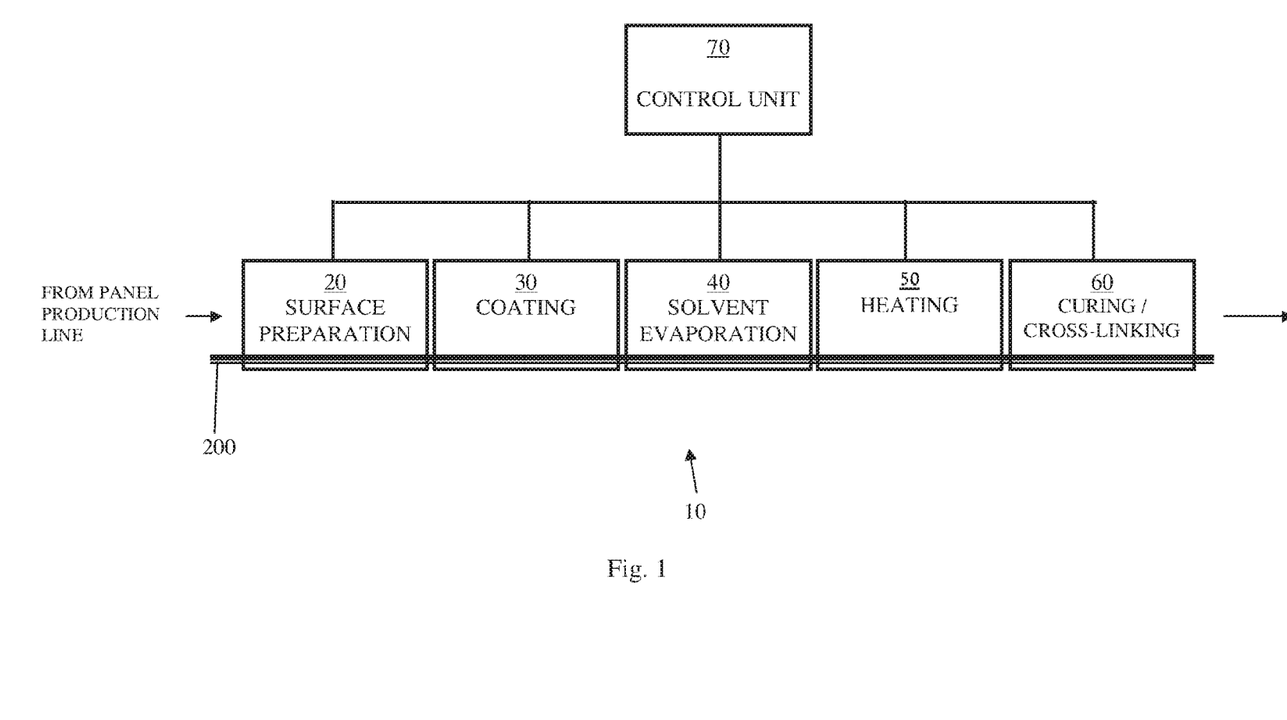
FIG. 1 is a schematic block diagram illustrating a coating system built and operative according to embodiments of the present invention.

Reference is made now to FIG. 1, which is a schematic block diagram illustrating a coating system 10 for coating a surface of a product built and operative according to some embodiments of the present invention. The product to be coated may be a rigid product, for example, a board or a panel and system 100 may coat at least one surface of the board or the panel. System 10 may comprise a coating unit 30, a curing unit 60 and a control unit 70. System 100 may further include a conveyor 200 which may be adapted to convey products to be coated into, through and out of system 10. System 10 may further comprise additional units as may be desired and/or required, depending on the substrate, on the coating system and method, etc. Accordingly, system 10 may further comprise pre-coating surface preparation unit 20 may be located before coating unit 30 along the production line. Substrate may enter system 10 via unit 20 and be treated so as to improve the performance of coating unit 30. For example, during the travel of the product through unit 20 it may be exposed to heating provided by any known heat source, such as hot air, thermal radiation, UV radiation and the like. Heating of the substrate may assist in improving the surface tension figure, therefore, unit 20 may include any device performing any method that improves the surface tension. Further, anti-static means may be used that may be achieved by corona radiation. These treatments may be applied onto the substrate and thus raise its temperature and as a result—it may strengthen the surface tension and the attraction of the coating material to the substrate. It will be apparent to those skilled in the art that pre-coating surface preparation unit 20 may be completely eliminated or may be designed and or tuned to provide the desired pre-coating treatment, as derived from the nature of the substrate, the coating material and the desired results of the coating.

Control unit 70 may perform all of the control tasks of the other units of system 10. Accordingly, control unit 70 may receive data indicative of the progress of the coating process in each unit, data indicative of the ambient conditions in various units, such as temperature, humidity, speed of progress, amount of radiation energy, distance of the deposition head form the substrate, etc. Control unit 70 may comprise a controller, a CPU or any similar controlling unit, and a non-transitory data storage unit, such as RAM, ROM, hard disk and the like. Control commands and programs may be stored on the non-transitory data storage which when executed may cause system 10 to carry out the operations described in this application.

Conveyor may pass through unit 20 in order to advance the product through unit 20 and to further provide it to coating unit 30. Conveyor 20 may convey products to coating system 10 from the production line. In some embodiments, coating system 10 may be adopted to be included in the product production line. In some embodiments, the production line may have a production rate and coating system 10 may be adopted to coat the surface of the product at the production rate.

Figure 2:
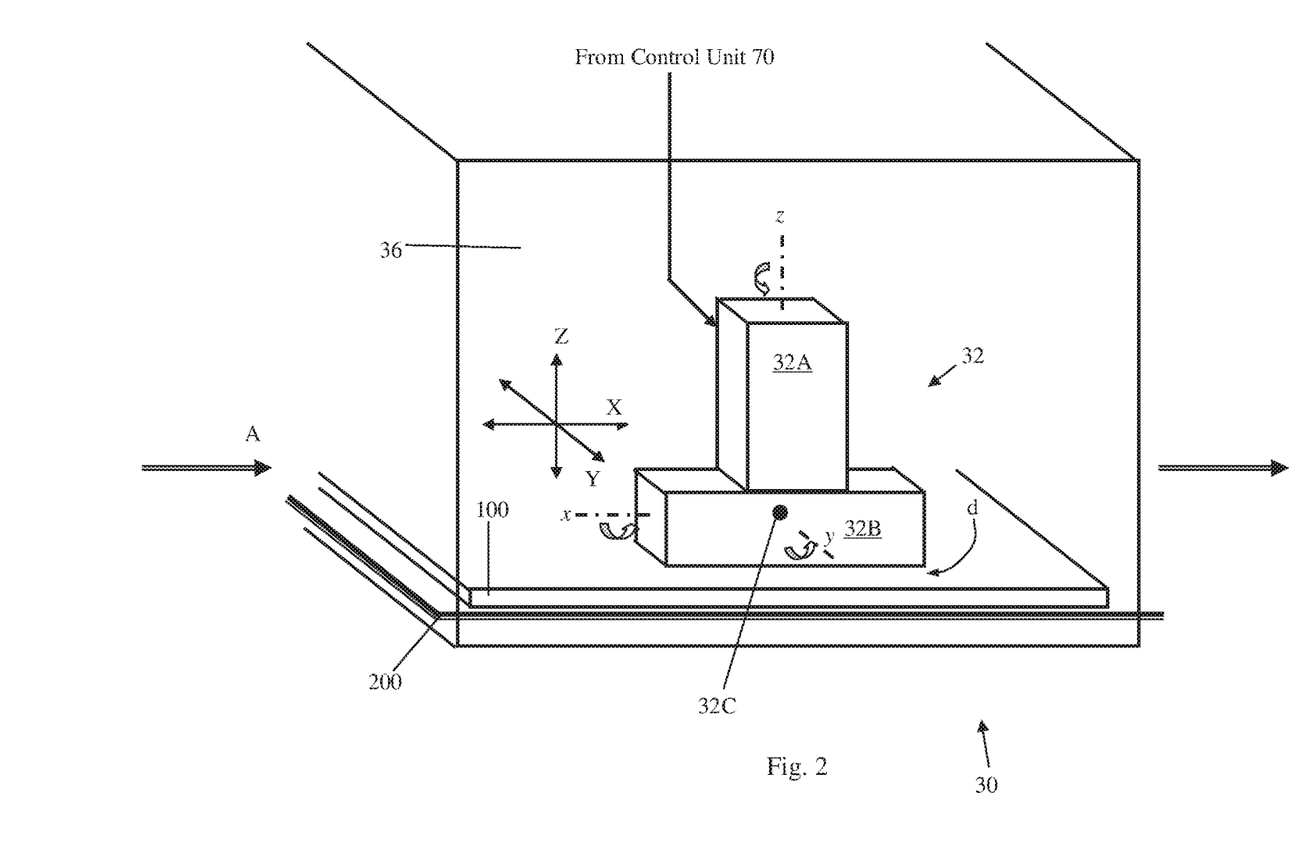
FIG. 2 is a schematic isometric diagram of a coating unit according to embodiments of the present invention.

Reference is made now also to FIG. 2, which is a schematic isometric diagram of coating unit 30, according to some embodiments of the present invention. Coating unit 30 may receive product (e.g., substrate) 100, for example by means of conveyor 200, directly from a production line (not shown) or from storage area and the substrate may or may not be pre-treated in pre-coating surface preparation unit 20, as may be desired. Coating unit 30 may comprise one or more droplet deposition assembly 32, such as ink-jet printing head known in the printing industry. Droplet deposition assembly 32 may be configured to deposit droplets of a coating material from a plurality of nozzles according to a predetermined deposition pattern, to form a coating on the surface of product 100. Droplet deposition assembly 32 may comprise droplet deposition head 32B, operatively connected to droplet head movement unit 32A. Droplet deposition head 32B may comprise a plurality of droplet deposition nozzles, formed in any desired line or array, typically aimed to deposit droplets onto the surface of the substrate 100 in deposition direction which is substantially perpendicular to the surface of the product, yet other deposition directions may be used, as may be required.

Droplet deposition head 32B may be movable by droplet head movement unit 32A relative to substrate 100 along one or more reference frame axes, such as Cartesian axes X, Y and Z as illustrated in FIG. 2, wherein axis X is parallel to the direction of movement A of conveyor 200 (or the production direction through coating unit 30), axis Y is perpendicular to axis X and parallel to the plane of conveyor 200 (or parallel to the plane of substrate when it is a flat sheet), and axis Z is perpendicular to axes X and Y. Droplet deposition head 32B may also be movable about an imaginary or real turning point 32C about one or more turning axes x, y, z in either direction, where turning axis x may be defined as perpendicular to plane Y-Z, turning axis y may be defined as perpendicular to plane X-Z, and turning axis z may be defined as perpendicular to plane X-Y.

Other definitions of the turning directions may be used, as long as the required degree of freedom of maneuvering is maintained. The degree of freedom may be selected according to the desired performance. For example, if only flat panels or sheets are to be coated, one or two Cartesian degrees of freedom may be required in order to provide full coverage of substrate 200, depending on the specific construction of deposition head 32B and the actual size of substrate 200 and another Cartesian degree of freedom may be required to enable control of the distance d from which droplets of coating material are deposited. When a 3D formed substrate (not shown) is to be coated, full 6-degrees of freedom may be required in order to provide coating in the required parameters, such as angle of deposition and distance d from the substrate surface. The control of deposition head 32B and of head movement unit 32A may be done by control unit 70, which may control all or part of the coating parameters, related both to the movement of deposition head 32B (in any one of the N degrees of freedom, $1 \leq N \leq 6$) and to the droplet deposition performance, such as droplet size, droplet temperature, droplet deposition speed, deposition distance, direction of deposition with respect to the direction of the surface being coated, etc.

As discussed hereinabove, one of the deposition parameters may be the droplet deposition speed at the surface of substrate 100, and another deposition parameter may be the droplet size. Both parameters may have great influence on the homogeneity of the coating layer. The smaller the droplet and the higher the deposition speed of the droplet, the higher is the tendency of droplets to unite with each other at a thinner coating layer. As the size of the droplets decreases, the deposition resolution needs to become higher (e.g., higher dots per inch (DPI) figure), in order to deposit the droplets in the required distance from one another. Typical resolution of the droplets deposition may be 600 DPI; however, other, typically higher, resolutions may be used. The internal elements of deposition head 32B, specifically those which are in direct contact with the coating materials, may be made of materials sustainable with the chemical features of the deposited materials. In some embodiments, control unit may control the deposition parameters such that the coating may have a thickness deviation of less than 1 micron per 1 meter.

Deposition head 32B may comprise any required number of nozzles, arranged in 1- or 2-dimension array, as is known in the art. Since deposition head 32B may move along axis Y, perpendicular to the direction of movement of the product that needs to be coated, deposition head 32B may deposit coating layer onto as wide as desired surfaces, where the width of the surface and the number of nozzles in depositing head 32B will dictate the coating velocity of the product. A typical coating speed may be 1-5 meters/min. Typical droplet deposition speed may be 7-9 meter/second and this speed may enable deposition from virtually any direction with respect to direction of gravity, since the magnitude of the gravity force acting on a deposited droplet is negligible compared with the deposition speed energy. Typical size of droplets according to embodiments of the present invention may be less than 50 Pico-liter, which is smaller than 30 Nano-gram. When deposited in a deposition rate of 30 kHz, a coating layer of less than 1 micron may be achieved and the coating's thickness deviation may be less than 1 micron per 1 meter. According to some embodiments of the present invention, the distance between two consecutive nozzles may be smaller than 350 microns, which enables high accuracy of the location at which each droplet is placed on the surface. Use of such printing heads imposes that the viscosity of the coating material will be in the range of 2-30 centipoises. With some coating materials, this viscosity requires use of solvents and/or heating of the coating fluid.

Figure 3:
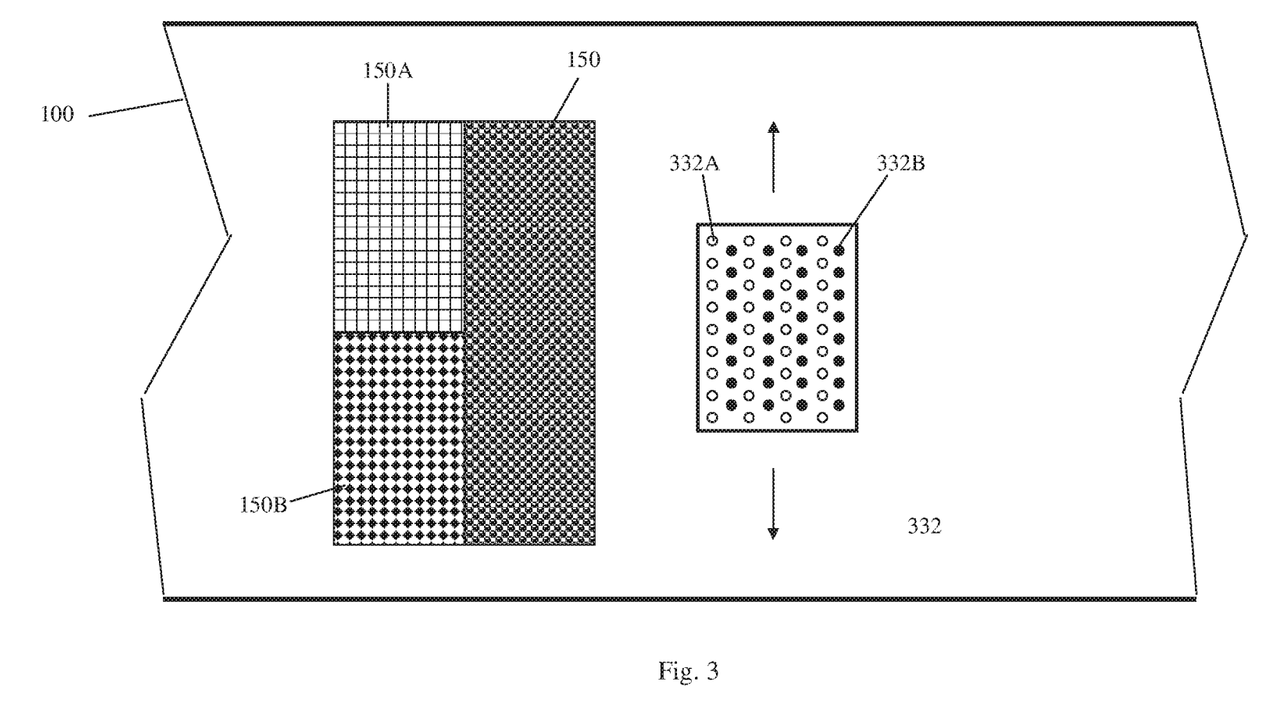
FIG. 3 is a schematic illustration of coating scheme according to embodiments of the present invention.
Figure 4:
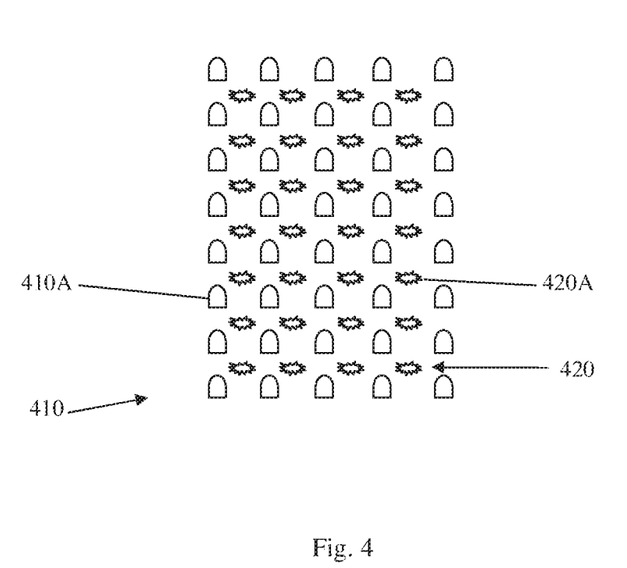
FIG. 4 is a schematic illustration of interlaced deposition schemes according to embodiments of the present invention.

Some embodiments of the invention may be related to a method of coating a surface of a product, for example, a ridged product such as a panel or a board. The method may include depositing droplets of a coating material in a predetermined pattern on the surface from a plurality of nozzles included in a droplet deposition assembly; the coating material includes at least one polymeric component. For example, a coating material that includes a urethane acrylate may be deposited using an inkjet print head having a plurality of nozzles. In some embodiments, the predetermined pattern may include depositing a single coating material, while in other embodiments the method may include depositing two different types of coating materials and the predetermined pattern comprises the location of each droplet from the two different types of coating materials, as illustrated in FIGS. 3-4.

In some embodiments, the method may further include curing the at least one polymeric component in the deposited coating material to form a coating on the surface of product 100. For example, the product may enter curing unit 60, a curing energy source, such as a UV lamp, may cause the at least one polymeric component to polymerized and harden, as to form a coating on the surface of the product. In some embodiments, the coating may have a thickness deviation of less than 1 micron per 1 meter.

A polymeric coating for coating a surface of a rigid product according to some embodiments of the invention may include a coating material having at least one polymeric component. The polymeric coating may be deposited on top of at least a portion of a surface of a ridged product, for example, a board or a panel. The coating may cover the surface of the product such that the thickness of the coating may have a thickness deviation of less than 1 micron per 1 meter, for example, less than 0.5 micron per meter. The polymeric coating, coated for example, by system 10, may be transparent in the visual light. For example, such coating may be at least 70% transparent to visual light according to ASTM D1003, for example, 80% or 90% transparent.

In some embodiments, the polymeric coating may have a width of at least 3 meters. The width of the coating may be defined as the relative distance that droplet deposition assembly 32 travels in the Y direction (as illustrated in FIG. 2) from one side of object 100 (e.g. a board) to the other side, while depositing the coating material. In some embodiments, assembly system may travel along the Y direction of object 100. Alternatively, object 100 may be movable in the Y direction with respect to assembly 32. In some embodiments, assembly 32 may have the width of object 100 such that no relative movement is required between assembly 32 and object 100.

Reference is made now to FIG. 3, which is a schematic illustration of a deposition patterns (e.g., a coating scheme), according to some embodiments of the present invention. Substrate 100 may pass through a coating unit, such as coating unit 30, in one of three possible coating embodiments. According to a first coating embodiment, the deposition head is moveable and is controlled similar to deposition head 32B of FIG. 2. The deposition head, such as deposition head 332, is adapted to deposit one coating material from all of the nozzles (i.e., 332A and 332B are the same), such that the entire deposition pattern 150 includes an homogeneous deposition of a single coating material. When substrate 100 passes through coating unit 30, deposition head 332 may deposit the coating material in order to get the needed characteristics after the (ultra violet) UV curing. Such a coating may have a thickness of at most 10 microns, for example, 1-8 microns or 0.5-5 microns.

According to a second coating embodiment, droplet deposition assembly 32 may be configured to deposit more than one type of coating material. For example, droplet deposition assembly 32 may be configured to deposit two types of coating materials and the predetermined pattern may include predetermined locations 150A and 150B for depositing droplets of each of the two types of coating materials. In some embodiments, each of the different coating materials may include polymeric component and curing (e.g., by curing unit 60) may include curing the polymeric component at each of the two different coating materials such that a cross-related matrix is formed having a desired feature of the two coating materials. The two different coating materials may be deposited, from two different sets of nozzles (332A and 332B). When product 100 passes through coating unit 30, deposition head 332 may deposit a first coating material according to a first deposition scheme, schematically represented by scheme 150A, to create a first matrix of coating and deposit a second coating material according to a second deposition scheme 150B, to create a second matrix of coating. When the first and second coating materials are placed, or registered, substantially on top of each other shifted with respect to each-other (registered) as schematically represented by scheme 150, the second coating material may react with, or cross-link with, or mechanically relate to the first material thus creating a combined coating material presenting new features of the combination of the features of the first and the second coating materials for example with enhanced bonding to the surface of product 100. For example, the first coating material may be acrylic resin which provides abrasion, scratch, chemical and UV resistance. The second coating material may be a silver/mercury compound, which provides anti-bacterial property.

According to the third coating embodiment, deposition head 332 is also adapted to deposit two different coating materials from two different sets of nozzles like method no. 2. The droplets will be deposited next to each other in order to provide a porous surface which may provide mechanical protection for material 410A that includes solution with solid functional particles by material 410B that includes a polymeric component, such that the predetermined pattern comprises functional particles of the material 410A interlaced in a grid of the material 410B. For example, nanoparticles of silica filaments may find mechanical protection between droplets of acrylic resins as schematically described in FIG. 4, which is a schematic illustration of interlaced deposition schemes 410A and 410B, according to embodiments of the present invention, in which high dots of urethane acrylate (graphically represented by the symbol ∩) are interlaced with dots of silica between (graphically represented by the symbol ⋄), to achieve anti-scratch and hydrophobic coating layer with improved resistance to physical removal of the silica dots due to the physical protection by the urethane acrylate grid:

In some embodiments, the deposition of two materials may lead to polymerization (by curing) of the two materials directly on the coated surface which, according to some embodiments of the invention, may result a coating layer having the desired features of the two materials. A coating having two coating materials deposited on the substrate at the predetermined pattern (e.g., patterns 150, 150A, 150B, 410A, and 410B) may have a thickness of 20 microns or less.

It will be apparent that the result of cross-related matrices 150A and 150B, creating a combined matrices coating 150 may be achieved using deposition heads other than 332. For example, two different deposition heads, the first depositing the first coating material and the second depositing the second coating material, while a control unit, such as control unit 70, governs the exact location of each of the coating material droplets in a matrices. According to another embodiment, only single deposition head may be used, in two consecutive passes, where the deposition of the second coating material may be carried out after the deposition of the first coating material. This embodiment may lower the cost of the deposition unit on the expense of lower coating capacity, and the first and second coating materials will have to be selected properly so that the time gap between the deposition of the first and of the second materials will not harm the required final result.

According to yet another embodiment, the second coating material may be deposited onto the first coating material (first and second coating schemes are substantially overlapping), thus enabling polymerization of the first and the second materials directly on substrate 100.

In some embodiments, the coating may include a repetitive deposition pattern, of first and second coating materials (e.g., patterns, 150A, 150B, 410A and 410B). Such repetitive pattern may have a constant distance between and two neighboring particles, of the same coating material and/or another coating material in at least one of a row and a column of the pattern. In some embodiments, the distance may be at most 70 microns.

In some embodiments, the method may further include heating the surface of the product prior to depositing the coating material, for example, by using surface preparation unit 20.

When the deposited coating material involves relatively high capacity of solvents, the method may include, evaporation the solvents remaining at the outlet of coating unit 30 in solvent evaporation unit 40, for example by means of heating, forced venting and spontaneous evaporation by time. It will be appreciated by those skilled in the art that evaporation of residual solvents may be done spontaneously, or may not be required at all, depending, among other, on the initial amount of solvents in the coating material, the evaporation tendency of the solvent, the production speed and the ambient conditions.

When a highly thin coating is required and/or when yet additional evaporation of residual solvents is required, the method may include heating the coated material after the deposition. Substrate 100 may pass through heating unit 50 in which the coating is heated to a temperature range depending on the previous process temperature. If the deposition relied on coating with solvents, the heating will be applied to lower the viscosity of the coating material to allow residual solvents to evaporate and to improve wetting of the substrate by the coating material, or optional range of temperature-30-120° C. depending on the solvent selection and the resin type in order to assist residual solvent trapped between the coating layer and the surface of substrate 100 to evaporate. The heating may also assist in flattening the coating layer by heating the coating material the viscosity figure of which is now higher, due to the evaporation of the solvent, such that the coating thickness deviation is a low as possible, for example, less than 1 micron per 1 meter, or even less than 0.5 micron per 1 meter. The length of exposure of substrate 100 to heat in heating unit 50, and the temperature of heating may be decided according to the selected coating material, the initial capacity of solvents, the production speed, the ambient conditions and the like. All of these parameters may be controlled by control unit 70 as to cause the coating thickness deviation to be of less than 1 micron per 1 meter.

After the required amount of solvents (if any) has been evaporated substrate may pass through curing/cross-linking unit 60. Curing unit 60 may include curing by ultraviolet radiation or any other curing device known in the art. In some embodiments, the coated product may be transferred to curing unit 60 directly after coating unit 30. Additionally, the coated product may be heated by heating unit 40 prior to entering curing unit 60.

The inventor of the present invention has discovered, during experiments, that the following production variables may give improved results when reside in the ranges depicted below. Improved results may mean, in the description of embodiments of the present invention required thinner coating layer, more homogenous coating layer, faster production of the coating layer, use of less solvent materials, use of less energy during production.

Heating of the coating material during, or shortly before the printing head was found to provide better results as the temperature of the coating material was higher, thus providing better wetting features of the coating material, better spreading and leveling of the coating material and more homogeneous coating. A preferred range of temperature for liquid coating materials with viscosity range below 100 Centipoise (for example, urethane acrylate type) was 30-60° C., and a further preferred temperature of the coating materials in the printing head before depositing may be 80° C.

The size of deposited droplets may give better coating results as it is made smaller, since as the droplet is smaller, its wetting characteristics of a surface improve. According to some embodiments of the invention, the method may further include controlling the droplets size to be in a preferred range of droplet size for example, the droplets may be smaller than 50 Pico liter. For example, the preferred range for a coating material type urethane acrylate may be 10-35 Pico liter.

The velocity of a droplet of coating material, measured at the outlet from the printing head has also influence of the quality of the coating. In some embodiments, the method may include controlling a velocity of the droplets to be less than 20 meter/second. For example, it was found that for a coating material type urethane acrylate deposition, velocity of droplets in the range of 7-9 meter/second proved good wetting results (i.e., homogeneity and thinner layer) and good visual results (i.e., the coating seems to the eye clean and clear). It will be noted that too low depositing velocity may cause too small spreading of the droplet on the surface, and too high depositing velocity may cause particles of the droplet to bounce back from the surface and tear off the droplet causing uneven coating at that location. In general, the kinetic energy given to the droplet due to the deposition velocity should balance with the surface tension force of the droplet, so that maximum spreading of the droplet is achieved without causing the droplet to break or to bounce back from the surface.

The optimal distance of the deposition head from the surface was tested. In some embodiments, the distance between a face of droplet deposition assembly 36 facing the surface and the surface 100 is between 0.5-10 mm. For example, for a coating material type urethane acrylate, deposition distance of 1-3 mm proves good coating features when the deposition velocity is in the preferred range defined above. Deposition in this velocity range and distance range ensures good in spreading of the droplet, and, together with the fact that the spreading remains in a specific confined area on the surface, it is also ensured that the required deposition resolution is maintained. Due to the high level of control of the distance of deposition head from the substrate surface and further on the deposition velocity, in conjunction with the coating materials' specific physical features, deposition direction from the deposition head to the coated surface may be done in virtually any direction with respect to the gravity direction. The differences between extremum such as deposition with the direction of gravity and opposite the direction of gravity may be compensated by, for example, increasing the deposition velocity when depositing in a direction opposite to the direction of gravity, compared to the deposition velocity when depositing parallel to the direction of gravity.

The thickness of the coating layer may be controlled and may be lowered to less than 10 microns (depending on the coating material). The deposition parameters through which the deposition thickness may be controlled may be the voltage of the deposition (which controls the deposition velocity) and frequency of deposition (which controls the number of droplets per certain defined coated area), and it is possible to control the degree of cross-linking (DC) of two materials that are deposited on each-other. By means of analysis of the level of cross-linking, it is possible to reach coating layer of cross-linked materials as thin as 18 microns. Other deposition and coating parameters that take part in the process may be coating speed of the substrate of 1 m/minute, spontaneous evaporation of the solvent in room temperature for 2 minutes and then exposure to heating gradient from 60° C. to 90° C. in 2 minutes by a mercury lamp of the type H+. The degree of cross-linking of the coating materials in the different depths of the coating layer may be controlled through control of the temperature the materials is exposed to and/or the time of exposure. Too fast cross linking at the surface of the coating layer may be delayed by the undesired reaction of the materials with oxygen in the air instead of cross-linking.

Cross-linking in depth relatively far from the surface of the coating may be delayed, or maintain low degree of cross-linking, stage due to poorer penetration of the lamp's excitation/curing energy.

Figure 5:
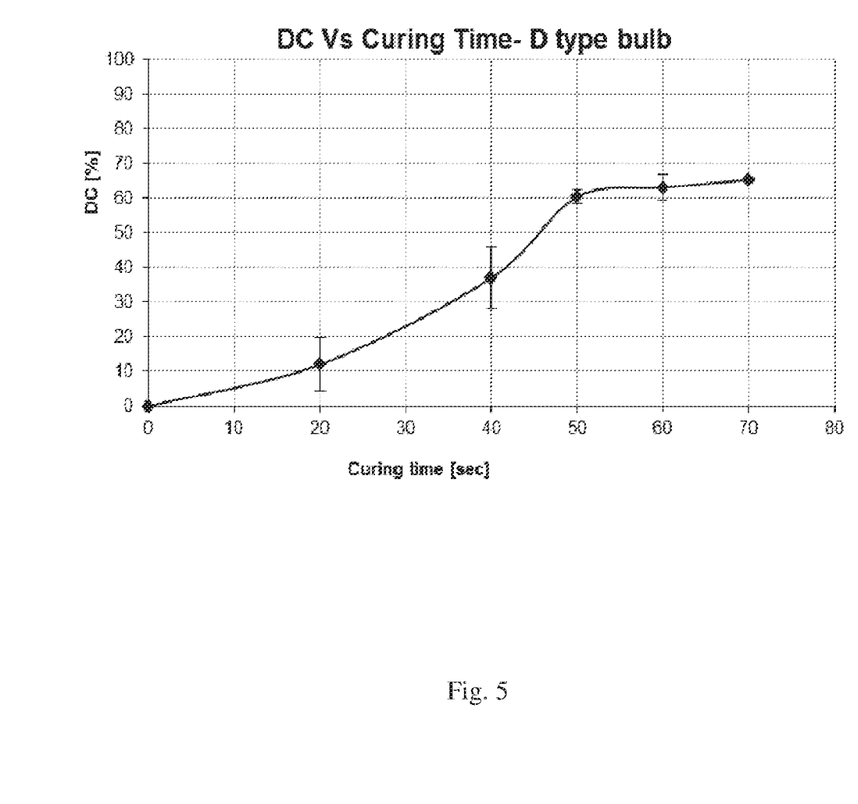
FIG. 5 depicts the effect of the depth of the coating layer on the level of cross-linking according to embodiments of the present invention.

Reference is made to FIG. 5, depicting the effect of the depth of the coating layer on the level of cross-linking according to embodiments of the present invention. It may be seen that the highest degree of cross-linking (percentage) is achieved, in the example, of FIG. 5, at depth of about 18 microns with cross-linking degree of approx. 80%, while closer to the surface (at 15 microns) the degree of cross-linking is lower (approx. 70%) and at higher depths, e.g. in depth of 30 microns, the degree of cross-linking is approx. 68%.

The abrasion resistance as the outcome of the degree of cross-linking, after the end of curing stage, may be measured by the Taber ASTM D1044 standard for testing level of grinding.

With the material urethane acrylate, the results after 100 grinding revolutions showed degradation of less than 4% in the visual light transparency of the coating layer and after 500 revolutions degradation of less than 8% of visual light transparency.

The degree of viscosity of the coating material, at the time of deposition, has effect on the quality of the final coating. The lower the viscosity, the more deposited droplet will tend to spread, be thin and create more homogeneous layer with neighboring droplets. On the other hand, lower viscosity requires, with many of the usable coating materials, longer time of solvent evaporation, higher pre-heating and higher amount of evaporation energy. The inventor of the present invention has discovered that, with coating material of urethane acrylate, viscosity in the range of 2-30 centipoise (cP) brings high quality of the coating layer.

Figure 6A:
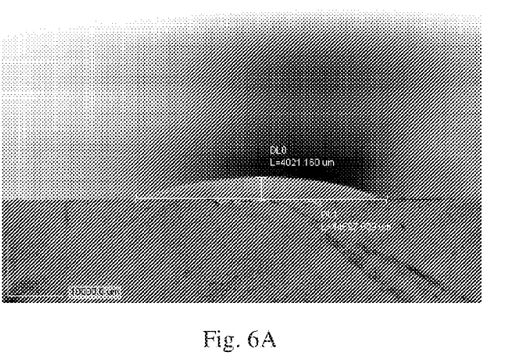
FIGS. 6A-6F depict the dependency of the thickness of a flattening droplet on the size (or volume) of the droplet.
Figure 6B:
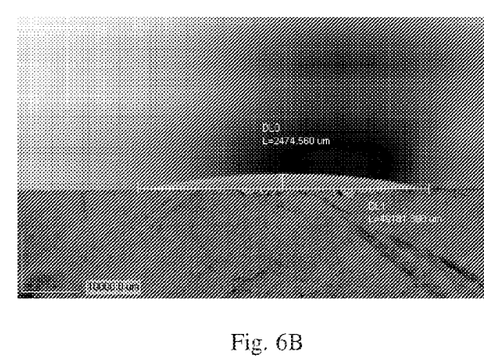
Figure 6C:
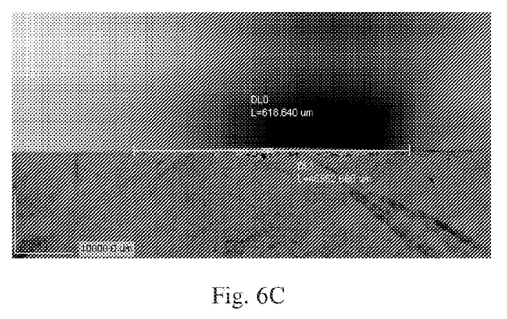
Figure 6D:
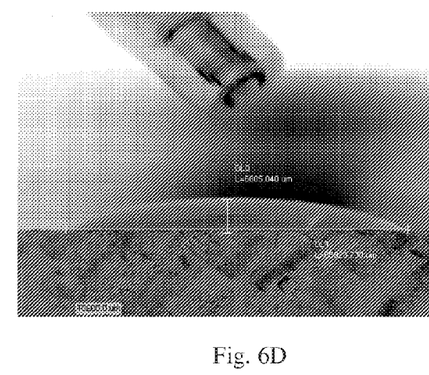
Figure 6E:
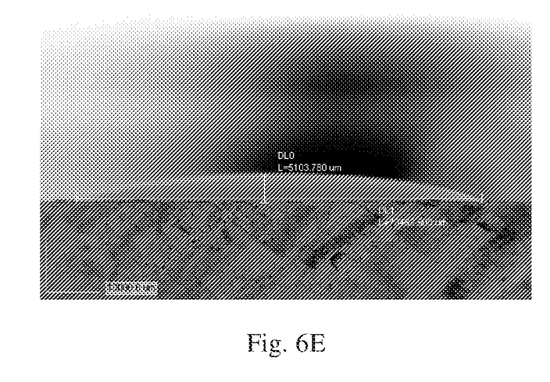
Figure 6F:
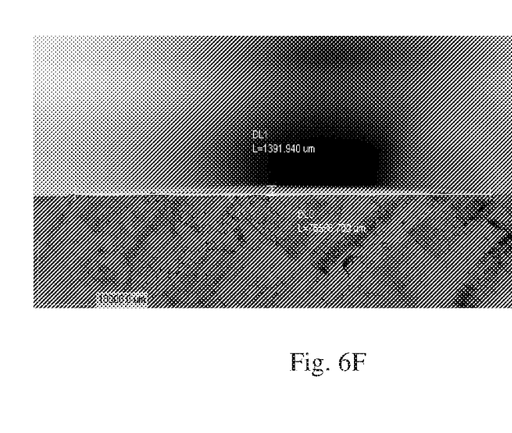

Reference is made to FIGS. 6A-6F, which depict the dependency of the thickness of a flattening droplet, on the size (or volume) of the droplet. FIGS. 6A-6C depict three stages of flattening of a 5 ml droplet, and FIGS. 6D-6F depict three stages of flattening of a 25 ml droplet. In FIG. 6A, a droplet is presented laying on a polycarbonate (PC) surface. The initial thickness of the droplet is 4021.162 µm. In FIG. 6B, the droplet's thickness is 2474 µm, and in FIG. 6C, the virtually final thickness of the droplet is 618. For a 25 ml droplet, it may be seen in FIG. 6D that the initial thickness of the droplet is 6805 µm. In FIG. 6E, the droplet further flattens to reach thickness of 5103 µm, and in FIG. 6F, the droplet of 25 ml reaches a virtually final thickness of 1391 µm, which is more than twice the final thickness of the 5 ml droplet.

The achievable resolution of deposition was also examined, in the range of 500-3000 dots per inch (DPI). Assuming a relatively fixed size/volume of a deposited droplet, it was found that the higher the thickness of the coating layer is, the higher is the achievable resolution, since droplets may be deposited in multiple deposition sub-layers and, therefore, may be located in higher density per given substrate area. It was discovered that, for the conditions comprising temperature of 40° C. in the preheat stage before the application stage, a stay of 2 minutes in a room temperature at the evaporation tunnel and exposure to 60-90° C. at the heating tunnel, deposition at resolution of 1100 DPI provides optimal result for homogeneous coating layer. The resolution of deposition may be controlled by controlling the conveyor speed and frequency of deposition cycles. These interrelations of these parameters may be expressed by:

$$\frac{\frac{drops}{sec}}{no\ of\ nozzles} \times const = frequency \quad (1)$$

$$\frac{frequency}{line\ speed} \times const = DPI \quad (2)$$

The dependency of the tendency of the coating material to peel off the substrate plate subject to the final heating temperature was also examined.

Figure 7:
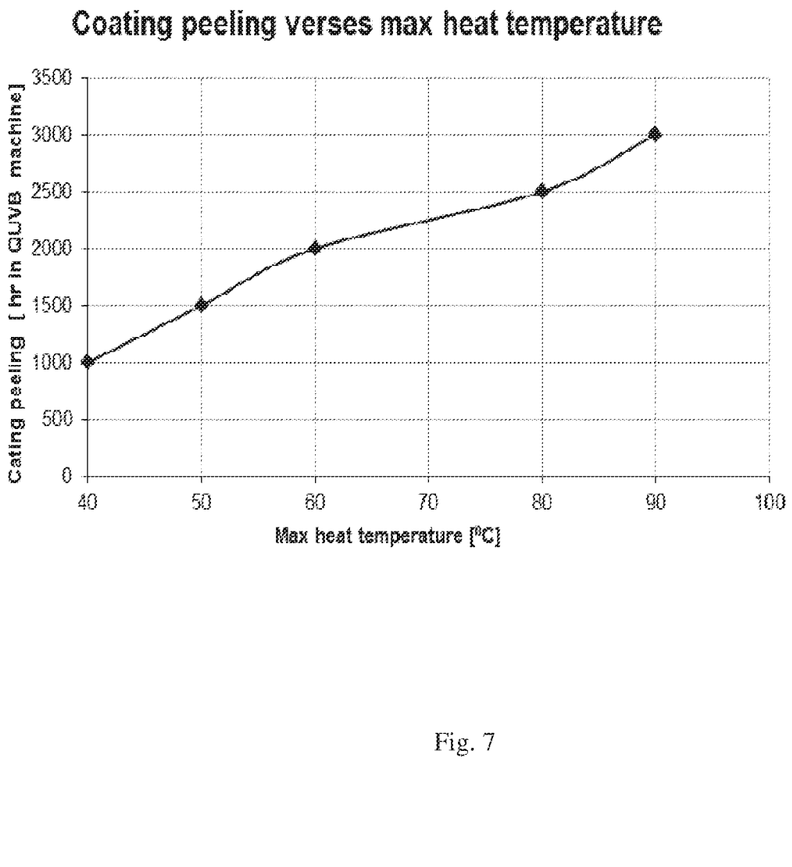
FIG. 7 is a graph showing the dependency of tendency of the coating layer to peel off the substrate subject of the heating temperature in the heating section, according to some embodiments of the present invention.

Reference is made now to FIG. 7, which is a graph showing the dependency of tendency of the coating layer to peel off the substrate (measured in the number of hours of exposure to IV radiation before the coating layer begins to peel off) subject of the heating temperature in the heating section. It is seen clearly that the higher the heating temperature is, the better is the attachment of the coating layer (the lower is the tendency to peel off). When the final heating temperature is 40° C. the coating material will begin to peel off after 1000 hours of exposure to ambient conditions, and when it is heated to final temperature of 90° C., it will hold for 3000 hours in ambient conditions before peeling off.

The effect of the time of travel of a coated substrate in the drying/evaporation unit (or the speed of the conveyor moving the coated substrate through the drying/evaporation unit) according to some embodiments of the present invention was also examined.

Figure 8:
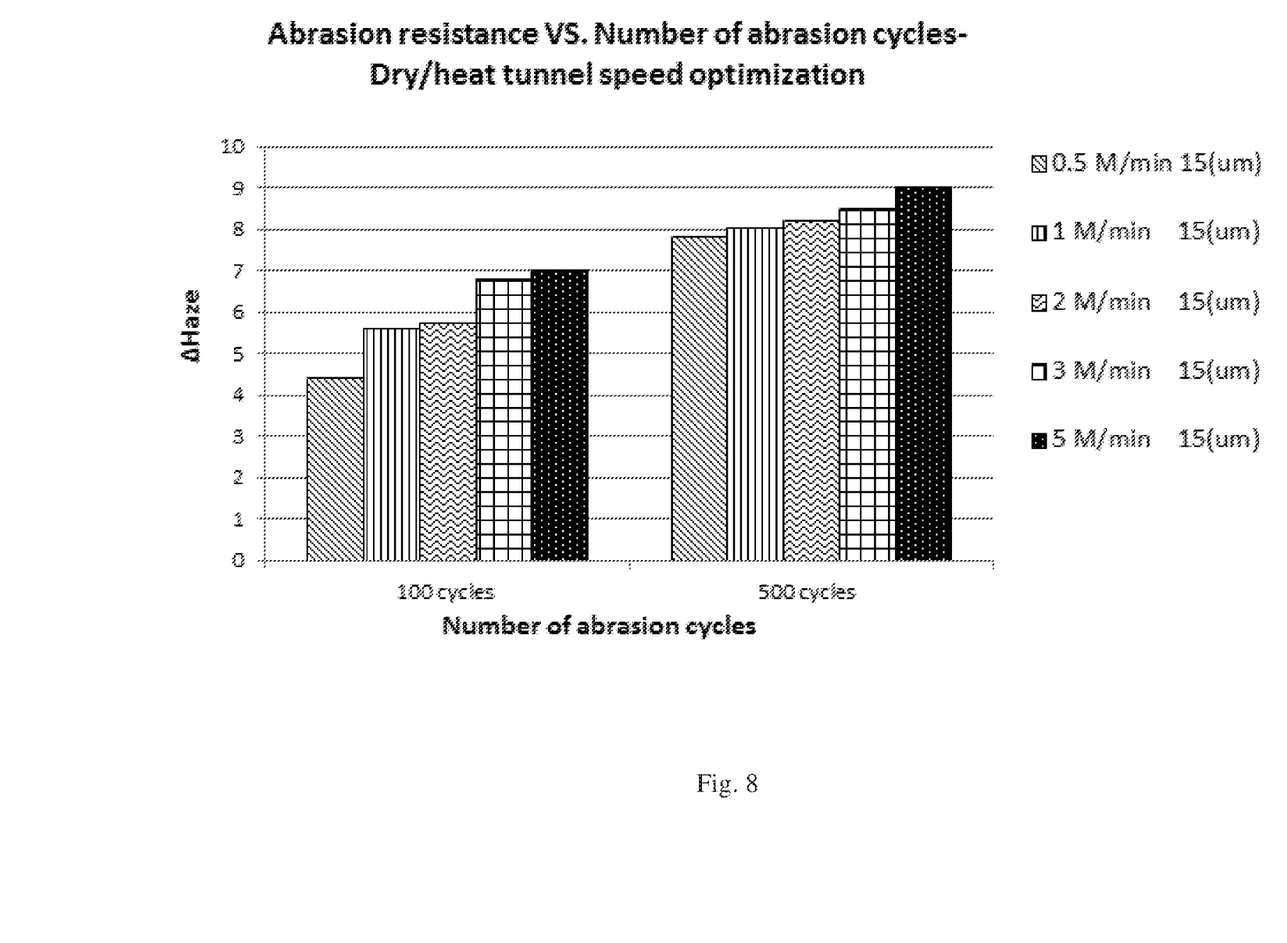
FIG. 8 depicts the effect of the time of travel of a coated substrate in the drying/evaporation unit, according to some embodiments of the present invention.

Reference is made now to FIG. 8, which depicts the effect of the time of travel of a coated substrate in the drying/evaporation unit, for 5 different speeds of the conveyor (0.5, 1, 2, 3 and 5 m/min) for two different number of abrasion cycles (100 and 500 cycles). The resistance to abrasion is presented by grade of haziness of the substrate. It is clearly seen that the longer the substrate stays in the drying/ evaporation unit, the lower is the haziness grade (showing better resistance to abrasion). The explanation may be that the longer the coating stays in the drying/evaporation unit, the higher is the percentage of evaporation of the solvents and the higher is degree of crosslinking.

The quality of coating according to some embodiments of the present invention depends, inter alia, on the wetting factor of the coating material with respect to the substrate being coated. For example, the surface tension number of PC is 38 mN/m, and the surface tension factor of a coating material used by the inventor in tests is 33 mN/m, which complies with the requirement that the coating material should have surface tension factor lower than that of the substrate it is coating. The surface tension of the substrate may be made even higher by raising its temperature, which in turn will improve the wetting of the coating layer.

According to some embodiments of the present invention, the use of a deposition head (one or more) for depositing two materials that should react to create high degree of crosslinking with a deposition scheme that deposits one of the materials onto the other material, with droplets as small as 10-15 Pico liter in volume, and deposition of the second material offset with respect to the in deposition location of the first material, the intense contact of the two materials with each other may encourage higher degree of crosslinking even with less use of heating or curing by radiation, due to intense reaction between the droplets of the two materials, and especially when the two materials tend to dissolve with each other.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A coating system for coating a surface of a rigid product, comprising:
   a conveyor for conveying rigid products to a coating unit, wherein the rigid products are selected from a group consisting of: panels and boards;
   a coating unit, comprising:
   a droplet deposition assembly configured to deposit droplets of a polymeric coating material from a plurality of nozzles according to a predetermined deposition pattern, to form a polymeric coating having thickness deviation of less than 1 micron per 1 meter on the surface of the rigid product;
   a first heating unit configured to cause a predetermined temperature gradient along the product in a production direction;
   a curing unit, located after the heating unit with respect to the production direction, for curing at least one polymeric component included in the polymeric coating material; and
   a control unit configured to:
      receive the predetermined deposition pattern; and
      control the coating unit to deposit the predetermined deposition pattern on the surface of the rigid product.

2. A coating system according to claim 1, wherein the droplet deposition assembly comprises:
   a droplet head having a plurality of droplet deposition nozzles; and
   a droplet head movement unit for moving the droplet head.

3. A coating system according to claim 2, wherein the droplet deposition assembly is configured to deposit two types of coating materials and the predetermined pattern includes predetermined locations for depositing droplets of each of the two types of coating materials.

4. A coating system according to claim 2, wherein the droplet deposition assembly is an inkjet printhead.

5. A coating system according to claim 1, wherein the predetermined temperature gradient is from 60° C. to 90° C.

6. A coating system according to claim 1, comprising:
   pre-coating surface preparation unit configured to treat the surface prior to depositing the pattern.

7. The coating system of claim 6, wherein the pre-coating surface preparation unit comprises at least one of: a second heating unit and an anti-static mean.

8. A coating system according to claim 1, wherein the coating material includes a solvent and the coating system further comprises a solvent evaporation unit.

* * * * *